(12) United States Patent
Meng et al.

(10) Patent No.: US 11,996,696 B2
(45) Date of Patent: May 28, 2024

(54) POWER SUPPORTING ARRANGEMENT FOR A POWER GRID

(71) Applicant: Hitachi Energy Ltd, Zürich (CH)

(72) Inventors: Lexuan Meng, Västerås (SE);
Jean-Philippe Hasler, Västerås (SE);
Gunnar Ingeström, Västerås (SE); Jan Kheir, Västerås (SE); Tong Wu, Västerås (SE); Theodore Soong, Västerås (SE)

(73) Assignee: HITACHI ENERGY, LTD, Zürich (CH)

( * ) Notice: Subject to any disclaimer, the term of this patent is extended or adjusted under 35 U.S.C. 154(b) by 0 days.

(21) Appl. No.: 17/908,046

(22) PCT Filed: Apr. 2, 2020

(86) PCT No.: PCT/EP2020/059432
§ 371 (c)(1),
(2) Date: Aug. 30, 2022

(87) PCT Pub. No.: WO2021/197607
PCT Pub. Date: Oct. 7, 2021

(65) Prior Publication Data
US 2023/0119359 A1 Apr. 20, 2023

(51) Int. Cl.
*H02J 3/40* (2006.01)
*H02J 3/18* (2006.01)
*H02J 3/30* (2006.01)
*H02M 5/458* (2006.01)

(52) U.S. Cl.
CPC ........ *H02J 3/40* (2013.01); *H02J 3/18* (2013.01); *H02J 3/30* (2013.01); *H02M 5/4585* (2013.01)

(58) Field of Classification Search
CPC ...... H02J 3/40; H02J 3/18; H02J 3/30; H02M 5/4585; H02M 5/44; Y02E 40/30
See application file for complete search history.

(56) References Cited

U.S. PATENT DOCUMENTS

| | | | |
|---|---|---|---|
| 10,050,573 B2 * | 8/2018 | Wang | F03D 9/255 |
| 10,641,245 B2 * | 5/2020 | Kolhatkar | F03D 9/007 |
| 10,903,648 B2 * | 1/2021 | Brombach | H02J 1/102 |
| 10,931,115 B1 * | 2/2021 | Tiwari | H02J 3/381 |
| 10,944,269 B2 * | 3/2021 | Kleen | H02J 3/40 |
| 11,239,664 B2 * | 2/2022 | Tanaka | H02J 1/002 |

(Continued)

FOREIGN PATENT DOCUMENTS

| | | |
|---|---|---|
| CN | 104022674 A | 9/2014 |
| CN | 104145396 A | 11/2014 |

(Continued)

*Primary Examiner* — Emily P Pham
(74) *Attorney, Agent, or Firm* — Slater Matsil, LLP

(57) ABSTRACT

A power supporting arrangement for a power grid includes a first and a second voltage source converter with an AC side and a DC side. A DC link interconnects the DC sides of the voltage source converters. A first switching arrangement includes a number of settable positions. The AC side of the second voltage source converter is connected to the power grid and the first switching arrangement is connected between a first synchronous machine. The AC side of the first voltage source converter and the power grid and operable to selectively connect the first synchronous machine to the power grid or to the AC side of the first voltage source converter.

20 Claims, 4 Drawing Sheets

(56) References Cited

U.S. PATENT DOCUMENTS

| | | |
|---|---|---|
| 11,353,004 B2 * | 6/2022 | Beekmann .............. H02J 3/241 |
| 2005/0200337 A1 * | 9/2005 | Schreiber .............. H02J 3/1842 |
| | | 290/55 |
| 2007/0121353 A1 | 5/2007 | Zhang et al. |
| 2008/0001408 A1 * | 1/2008 | Liu ........................ F03D 9/255 |
| | | 290/44 |
| 2008/0137382 A1 | 6/2008 | Datta et al. |
| 2009/0218962 A1 * | 9/2009 | Kubal ...................... H02P 1/26 |
| | | 318/102 |
| 2009/0230689 A1 * | 9/2009 | Burra ..................... F03D 9/255 |
| | | 290/55 |
| 2010/0292852 A1 | 11/2010 | Gertmar et al. |
| 2011/0057446 A1 | 3/2011 | Mayor Lusarreta et al. |
| 2011/0309805 A1 | 12/2011 | Matveev et al. |
| 2012/0217824 A1 * | 8/2012 | Gupta ..................... F03D 7/028 |
| | | 307/145 |
| 2013/0197704 A1 * | 8/2013 | Pan ........................ H02J 3/381 |
| | | 363/35 |
| 2013/0200714 A1 | 8/2013 | Pan et al. |
| 2014/0247629 A1 | 9/2014 | Crane et al. |
| 2015/0108755 A1 * | 4/2015 | Das ........................ F03D 9/255 |
| | | 290/43 |
| 2017/0373533 A1 * | 12/2017 | Beekmann .............. F03D 9/257 |
| 2018/0026562 A1 * | 1/2018 | Hashimoto .............. H02J 3/38 |
| | | 290/40 B |
| 2018/0034264 A1 * | 2/2018 | Wagoner ................ H02P 9/102 |
| 2018/0302011 A1 * | 10/2018 | Ganireddy ............. F03D 9/257 |
| 2018/0323618 A1 * | 11/2018 | Wagoner ............... H02J 3/1842 |
| 2019/0214827 A1 | 7/2019 | Johnson, Jr. et al. |
| 2019/0273379 A1 | 9/2019 | Hasler et al. |

FOREIGN PATENT DOCUMENTS

| | | |
|---|---|---|
| EP | 1796254 A2 | 6/2007 |
| EP | 2280166 A1 | 2/2011 |
| EP | 2463978 A1 | 6/2012 |
| GB | 2553872 A | 3/2018 |
| JP | 2014124048 A | 7/2014 |
| WO | 2007027141 A1 | 3/2007 |
| WO | 2010077145 A1 | 7/2010 |
| WO | 2012093942 A1 | 7/2012 |
| WO | 2018053429 A1 | 3/2018 |
| WO | 2018072843 A1 | 4/2018 |
| WO | WO-2018127609 A1 * | 7/2018 ............... H02J 3/30 |

* cited by examiner

POWER SUPPORTING ARRANGEMENT FOR A POWER GRID

CROSS-REFERENCE TO RELATED APPLICATIONS

This application is a national stage application of International Application No. PCT/EP2020/059432, filed on Apr. 2, 2020, which application is hereby incorporated herein by reference.

TECHNICAL FIELD

The present invention generally relates to a power supporting arrangement for a power grid.

BACKGROUND

Synchronous machines are known to be used for supporting power grids with inertia.

The normal way for such support is through directly connecting the synchronous machine to the power grid via a transformer.

It is also known to connect a synchronous machine to a power grid via a switching arrangement and a power converter, where the switching arrangement either connects the synchronous machine to the converter or totally bypasses the converter. Thereby the synchronous machine can be connected to the power grid either directly or via the converter. An example of this can for instance be found in WO 2018/072843, where in case of a bypass the power converter is not used at all.

However, power grids may need to be supported in different ways, for instance with regard to frequency stability and short circuit level enhancement. At the same time there is often a need to limit the number of grid supporting devices used to support a power grid. However, then there is a need for an increased flexibility in which the support devices are connected to the power grid.

SUMMARY

The present invention generally relates to a power supporting arrangement for a power grid. Particular embodiments relate to a power supporting arrangement for a power grid. For example, embodiments can provide flexibility in the way in which power support devices can be connected to a power grid.

According to a first aspect, a power supporting arrangement for a power grid comprises a first voltage source converter having an AC side and a DC side, a second voltage source converter having an AC side and a DC side, a DC link interconnecting the DC sides of the first and second voltage source converters, a first switching arrangement with a number of settable positions, and a first synchronous machine. The AC side of the second voltage source converter is connected to the power grid and the first switching arrangement is connected between the first synchronous machine. The AC side of the first voltage source converter and the power grid thereby make the first voltage source converter into a machine side converter and the second voltage source converter into a grid side converter. The first switching arrangement is operable to selectively connect the first synchronous machine to the power grid or to the AC side of the first voltage source converter. The first synchronous machine is connected to the power grid in a first settable position of the first switching arrangement and to the AC side of the first voltage source converter in a second settable position of the first switching arrangement.

In a first variation, when the first switching arrangement is set in the second settable position, the power supporting arrangement is configured to provide reactive power and inertia support to the power grid, where the inertia is delivered from the first synchronous machine via the first and second voltage source converter and the DC link.

According to a second variation, when the first switching arrangement is set in the first settable position, the first synchronous machine is configured to supply inertia and reactive power to the power grid in parallel with the second voltage source converter providing reactive power support. Thereby the first synchronous machine may be configured to supply inertia directly to the power grid and the second voltage source converter may be configured to provide reactive power support in parallel with this inertia provision.

According to a third variation, the first voltage source converter is configured to provide reactive power support to the power grid in parallel with the second voltage source converter and in parallel with the inertia and reactive power from the first synchronous machine. It is possible that the first voltage source converter is configured to do this when the first switching arrangement has a third settable position connecting the AC side of the first voltage source converter to the power grid, where the first switching arrangement may have the third settable position together with the first settable position.

According to another variation, the power supporting arrangement further comprises a second synchronous machine, a third machine side voltage source converter, a fourth grid side voltage source converter and a second switching arrangement with the same settable positions as the first switching arrangement. In this case the DC side of the third voltage source converter is connected to the DC side of the fourth voltage source converter via the DC link and the second switching arrangement is operable to selectively connect the second synchronous machine to the power grid or to the AC side of the third voltage source converter when the first or the second settable positions are being set.

It is possible that when the second switching arrangement is set in the second settable position, the power supporting arrangement is configured to provide reactive power and inertia support to the power grid, where the inertia is delivered from the second synchronous machine via the third and fourth voltage source converter and the DC link.

Likewise, when the second switching arrangement is set in the first settable position, the second synchronous machine is configured to supply inertia and reactive power to the power grid in parallel with the fourth voltage source converter providing reactive power support. Thereby the second synchronous machine may be configured to supply inertia directly to the power grid and the fourth voltage source converter may be configured to provide reactive power support in parallel with this inertia provision.

When the power supporting arrangement comprises a second synchronous machine, a third machine side voltage source converter, a fourth grid side voltage source converter and a second switching arrangement, the first and second settable positions of the second switching arrangement may be set in the same way as in the first switching arrangement. As an alternative the first and second settable positions of the second switching arrangement may be set in the opposite way compared with the first and second settable positions of the first switching arrangement.

When the power supporting arrangement comprises a second synchronous machine, a third machine side voltage source converter, a fourth grid side voltage source converter and a second switching arrangement, the third voltage source converter may be configured to provide reactive power support to the power grid in parallel with the second voltage source converter and in parallel with the inertia and reactive power from the second synchronous machine. It is possible that the third voltage source converter is configured to do this when the second switching arrangement has a third settable position connecting the AC side of the first voltage source converter to the power grid, where the second switching arrangement may have the third settable position together with the first settable position.

The power supporting arrangement may according to another variation comprise an energy storage system connected to the DC link via a further converter. The further converter may be configured to supply or receive active power from or to the energy storage system for supporting the power grid.

The power supporting arrangement may according to another variation further comprise a connection arrangement connecting the switching arrangements and the second and fourth grid side voltage source converters to the power grid, where the connection arrangement may comprise a first and optionally also a second transformer.

The first transformer may be provided for connection of each grid side voltage source converter to the power grid and may be a single winding transformer.

The second transformer may be provided for connecting each synchronous machine and each grid side converter to the power grid. The second transformer may be a three-winding transformer comprising a first group of windings connected to a first bus leading to each synchronous machine, a second group of windings connected to a second bus leading to each grid side converter and a third group of windings for connection to the power grid.

The present invention has a number of advantages. It increases the flexibly in which grid support devices are connected to a power grid. This allows a limited number of power support devices to be used in a more flexible and versatile manner in order to implement different operational modes that can be used to support the power grid. Through these modes grid support devices included in the power support arrangement can also be put to a more efficient use.

BRIEF DESCRIPTION OF THE DRAWINGS

The present invention will in the following be described with reference being made to the accompanying drawings, where FIG. 1 schematically shows a first version of a power support arrangement being connected to a power grid and comprising a first switching arrangement, FIG. 2 schematically shows the first version of the power support arrangement connected to the power grid, where the first switching arrangement is shown in some more detail, FIG. 3 schematically shows a second version of the power support arrangement, FIG. 4 schematically shows a third version of the power support arrangement connected for operating in a first mode, FIG. 5 schematically shows the third version of the power support arrangement connected for operating in a second mode, and FIG. 6 schematically shows the third version of the power support arrangement connected for operating in a third mode.

DETAILED DESCRIPTION OF ILLUSTRATIVE EMBODIMENTS

In the following, a detailed description of preferred embodiments of the invention will be given.

Figure 1:
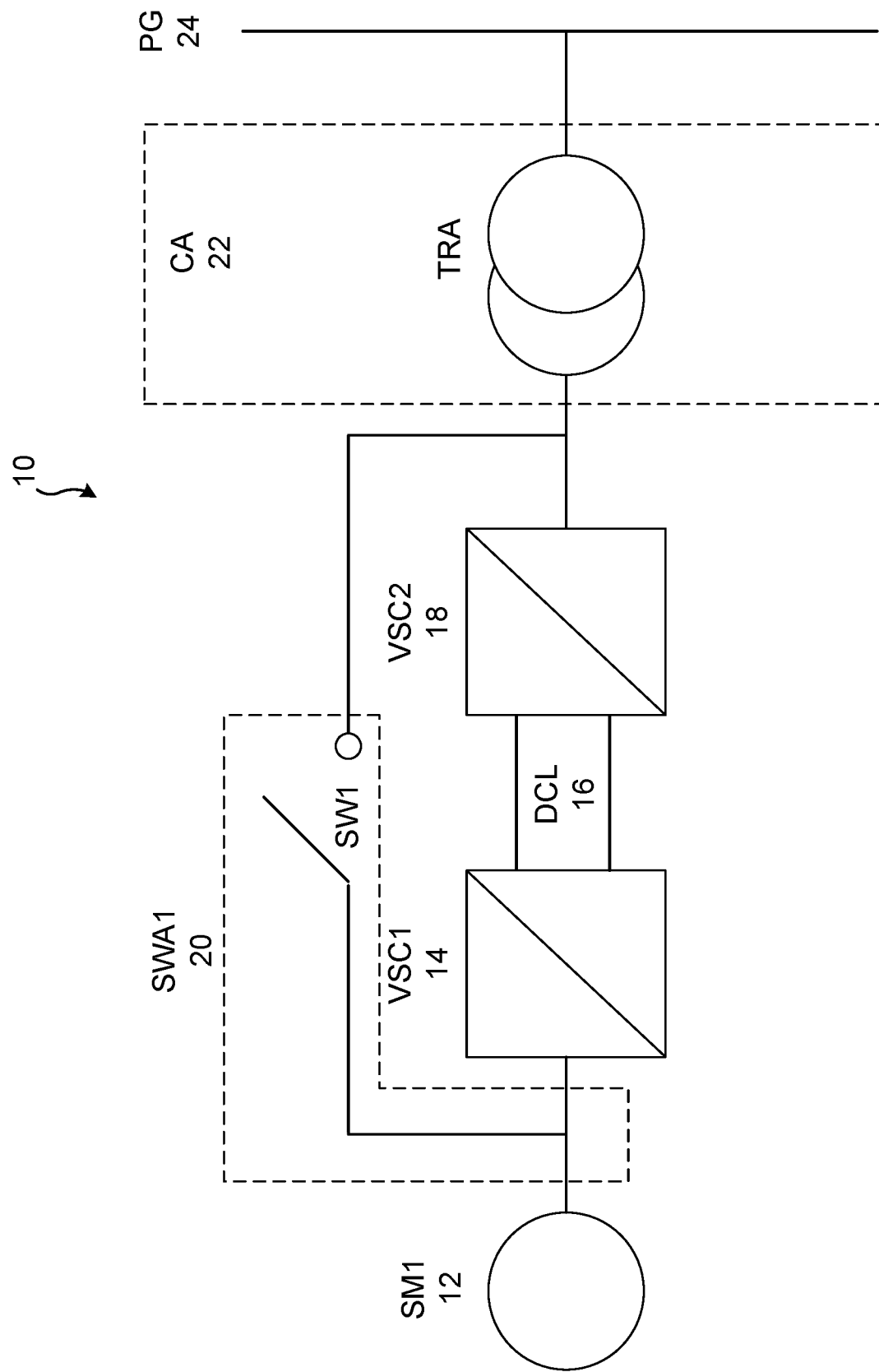

FIG. 1 shows a first variation of a power supporting arrangement 10 according to a first variation of the invention. The power supporting arrangement 10 comprises a first voltage source converter VSC1 14 having an Alternating Current (AC) side and a Direct Current (DC) side and a second voltage source converter VSC2 also having an AC side and a DC side, where the DC sides of the first and second VSCs 14 and 18 are interconnected via a DC link DCL 16. The AC side of the second VSC 18 is in turn connected to a power grid PG 24, in this case an AC power grid, that is to be supported. The connection is made via a connection arrangement CA 22 comprising a first transformer TRA. The connection of the AC side of the second VSC 18 to the power grid 24 is in this case made via the first transformer TRA. There is also a first switching arrangement SWA1 20 comprising at least one first switch SW1, where the first switching arrangement 20 is connected between a first synchronous machine 12, the AC side of the first VSC 14 and the grid that is to be supported. The first synchronous machine may be realized with or without a flywheel.

In the example shown in FIG. 1 the AC side of the first VSC 14 is connected to the first synchronous machine 12 and the first switch SW1 of the first switching arrangement 20 is connected between the AC side of the first VSC 14 and the AC side of the second VSC 18. The first VSC 14 can be considered to be a machine side VSC and the second VSC 18 can be considered to be a grid side VSC because the AC side of the first VSC 14 faces the first synchronous machine 12 and the AC side of the second VSC 18 faces the power grid 24. The first synchronous machine 12 and the VSCs 14 and 18 may also be considered to be grid support devices, because they are devices used to support the grid.

The first switching arrangement 20 has a number of settable positions and is operable to selectively connect the first synchronous machine 12 to the power grid 24 or to the AC side of the first VSC 14, where the first synchronous machine 12 is connected to the power grid 24 in a first settable position or setting of the switching arrangement 20 and to the AC side of the first VSC 14 in a second settable position setting of the first switching arrangement 20. It can be seen that when the first switch SW1 of the first switching arrangement 20 is closed the first switching arrangement 20 is in the first settable position where the first synchronous machine 12 is connected to the power grid 24 via the connection arrangement 22 and in this case also via the first transformer TRA.

The first transformer TRA may be provided for connection of each grid side voltage source converter in the power supporting arrangement 16 to the power grid 24. When the first switch SW1 is open, the first switching arrangement 20 is in the second settable position where the synchronous machine 12 is connected to the AC side of the first VSC 14. It can also be seen that the second VSC 18 is connected to the power grid via the first transformer TRA for both positions of the first switching arrangement. Here it may also be mentioned that it is optionally possible that also the AC side of the first VSC 14 is connected to the power grid via the connection arrangement 20 when the first switch SW1 is in the first settable position, i.e. is closed.

When the first switch SW1 of the first switching arrangement 20 is open and the first switching arrangement 20 is set in the second settable position, the power supporting arrangement 10 is operating in a first mode where it is configured to provide reactive power and inertia support to the power grid, where the inertia is delivered from the first synchronous machine 12 via the first and second voltage source converters 14 and 18 and the DC link 16. In this mode the synchronous machine 12 and the pair of VSCs 14 and 18 provide a first support function, where reactive power and inertia is provided to the power grid in a wide frequency range. This is of interest when the frequency of the power grid is unstable such as if it has a high rate of change of frequency (ROCOF).

However, when the first switch SW1 is closed and the first switching arrangement 20 is set in the second settable position, the power supporting arrangement 10 is operating in a second mode where the first synchronous machine 12 supplies inertia to the power grid 24 in parallel with the second voltage source converter 18 and perhaps also in parallel with the first voltage source converter 14 providing reactive power support to the power grid 24. In this second mode the first synchronous machine 12 thus provides inertia to the power grid without using the first and second VSCs 14 and 18 and the DC link 16. In this setting the first synchronous machine 12 may also supply reactive power to the power grid. However, the pair of VSCs 14 and 18 are still functioning and at least the second VSC 18 and perhaps also the first VSC 14 can be used to supply reactive power in parallel with the inertia and reactive power supplied by the first synchronous machine 12, which may be used for the supply of short-circuit current to the power grid 24 in case of faults. This is of advantage if the power grid has a low short-circuit level (SCL).

It can thereby be seen that the power supporting arrangement 10 according to the first version has a high level of flexibility. In the first settable position of the first switching arrangement when the bypass switch is open, the first synchronous machine can operate as a flywheel storage unit, the speed of which can vary in a wide range to deliver a substantial amount of synthetic inertia to the grid for frequency response, while in the second settable position of the first switching arrangement when the bypass switch is closed the synchronous machine can operate as a synchronous condenser, which is directly connected to the grid, for instance in case the SCL reaches a threshold. At the same time, the converters may be fully utilized in reactive power services. Thereby a majority and perhaps all of the grid support devices, i.e. the second VSC 18 and the first synchronous machine 12 as well as possibly also the first VSC 14, can be used when the first switch SW1 is closed. The power supporting arrangement 10 can thereby be used as an Enhanced STATCOM when the network inertia is low and used as STATCOM and synchronous condenser when the short circuit level is low, where STATCOM is an abbreviation for static VAR compensator, i.e. a reactive power supporting device.

Figure 2:
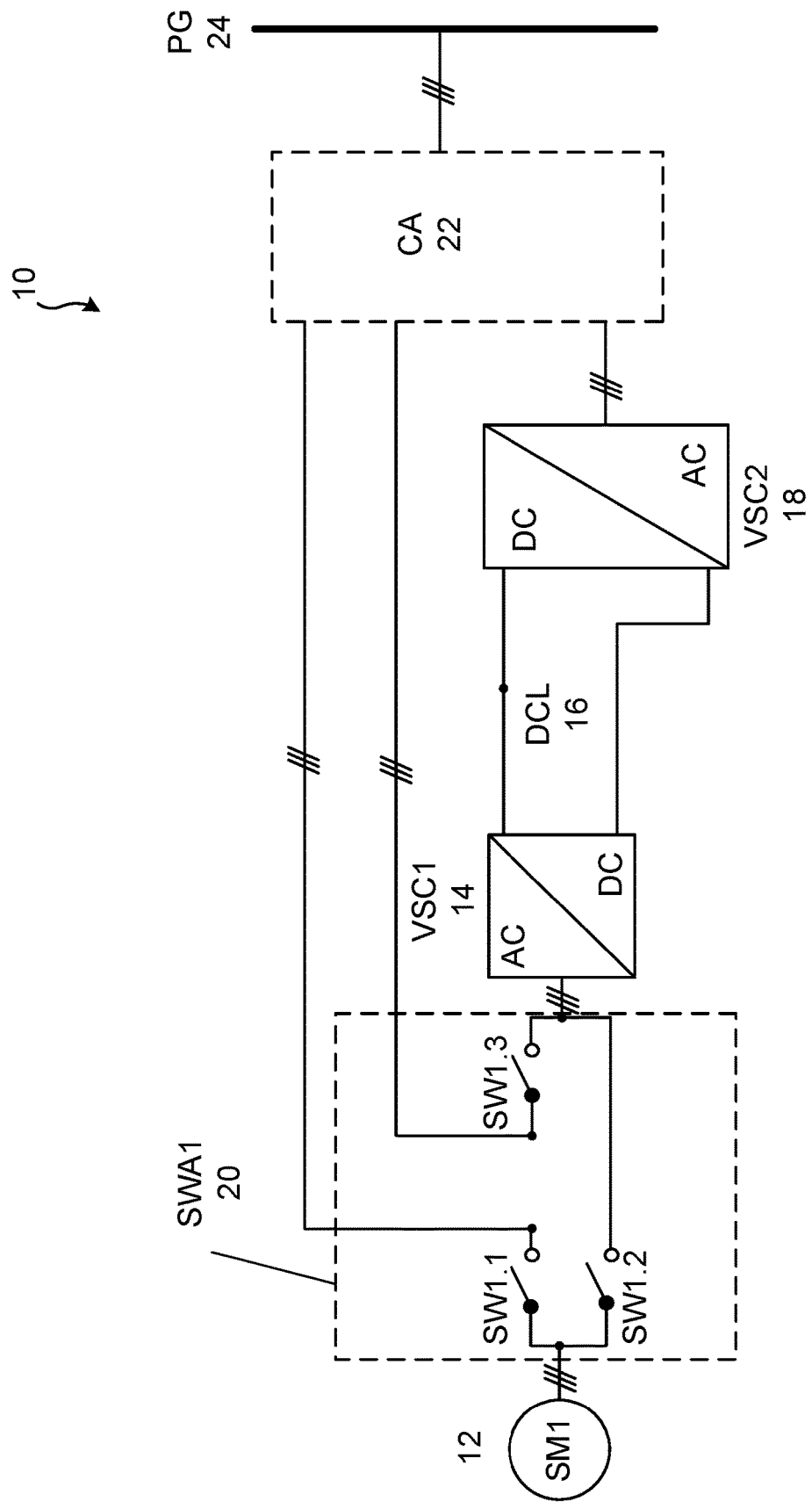

FIG. 2 shows a single line diagram of the first variation in some more detail. In this case the first switching arrangement 20 comprises a first switch SW1.1 selectively connecting the first synchronous machine 12 with the connection arrangement CA 22 and a second switch SW1.2 selectively connecting the first synchronous machine 12 with the AC side of the first VSC 14. The first switching arrangement 20 furthermore comprises a third switch SW1.3 selectively connecting the AC side of the first VSC 14 with the connection arrangement 22. The first switch SW1.1 when closed provides the first settable position of the first switching arrangement 20 and interconnects the first synchronous machine 12 with a first AC bus leading to the connection arrangement 22 and the third switch SW1.3 when closed provides a third settable position of the first switching arrangement 20 and interconnects the AC side of the first VSC 14 with a second AC bus leading to the connection arrangement 22. The second switch SW1.2 when closed provides the second settable position of the first switching arrangement 20.

The DC side of the first VSC 14 is again connected to the DC side of the second VSC via the DC link 16, where the AC side of the second VSC 18 is connected to the connection arrangement 22 via a third AC bus. The connection arrangement 22 comprises the previously mentioned first transformer (not shown) for connecting the AC side of the second VSC 18 to the power grid 24. In order to allow the first synchronous machine 12 and the AC side of the first VSC 14 to be connected to the power grid, the connection arrangement 22 may also comprise a second transformer (not shown). However, also in this case it is possible that only the first transformer is used.

Figure 3:
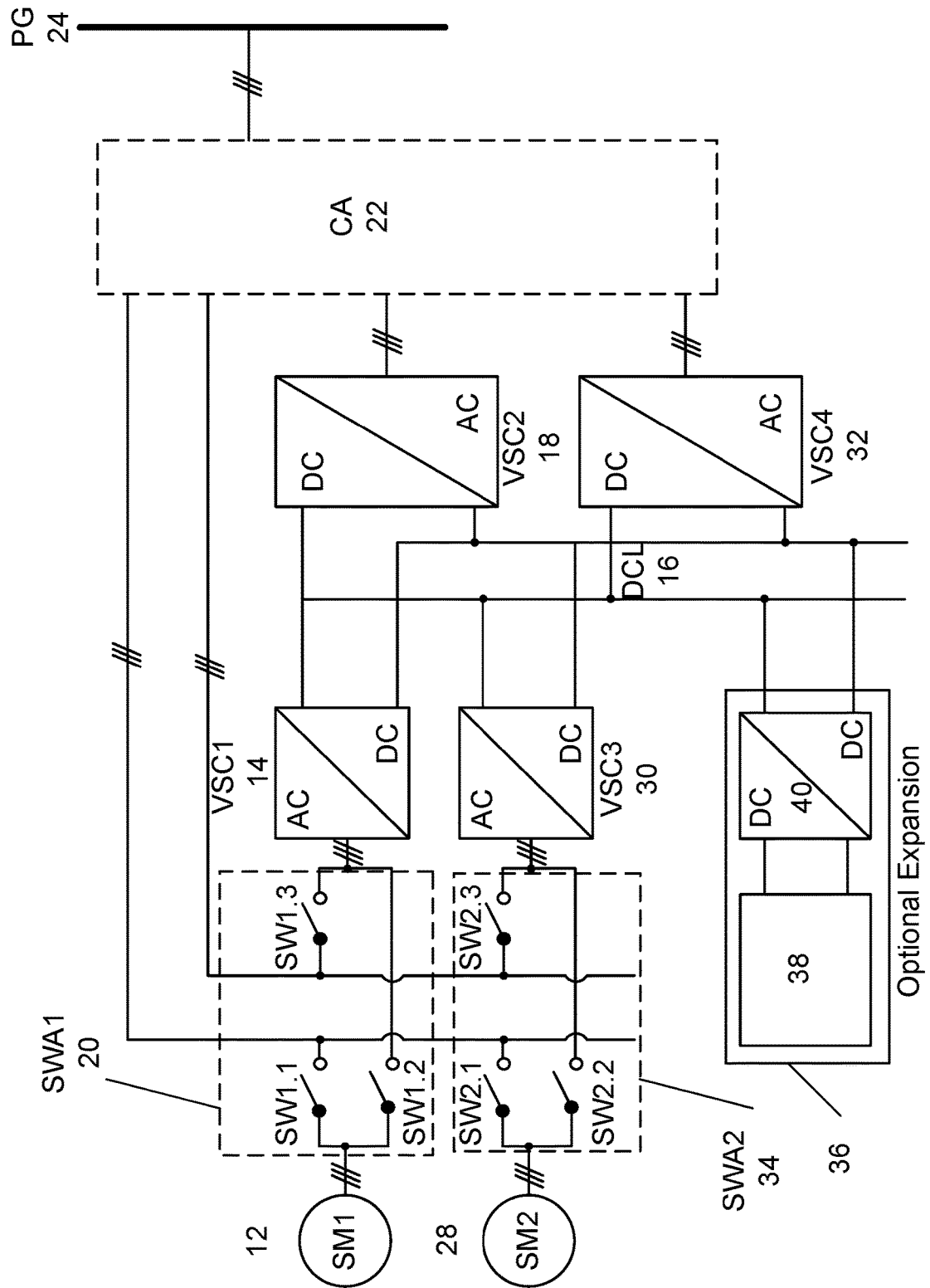

FIG. 3 schematically shows a single line diagram of a second variation of the supporting arrangement. In this case there is a first synchronous machine 12, a first switching arrangement 20 as well as a first and second VSC 14 and 18 connected in the same way as in FIG. 2. However, in this case there is also a second synchronous machine 28, a second switching arrangement SWA2 34, a third voltage source converter VSC3 30 and a fourth voltage source converter VSC4 32, where the third VSC 30 is a machine side VSC and the fourth VSC 32 is a grid side VSC. The second switching arrangement 34 has the same settable positions as the first switching arrangement. Thereby the second switching arrangement 34 is operable to selectively connect the second synchronous machine 28 to the power grid 24 or to the AC side of the third VSC 30 when the first or the second settable positions have been set.

The second switching arrangement 34 thereby comprises a first switch SW2.1 selectively connecting the second synchronous machine 28 with the connection arrangement CA 22, a second switch SW2.2 selectively connecting the second synchronous machine 12 with the AC side of the third VSC 30 and a third switch SW 2.3 selectively connecting the AC side of the third VSC 30 with the connecting arrangement 22. The first switch SW2.1 here interconnects the second synchronous machine 28 with the first AC bus and the third switch SW 2.3 interconnects the AC side of the third VSC 30 with the second AC bus.

The AC side of the fourth VSC 32 is connected to the connection arrangement 22 via a fourth AC bus, which fourth AC bus may also be connected to the previously mentioned first transformer (not shown).

There is finally an active power provision entity 36 comprising an energy storage system 38 and a further converter 40 that in this case is a DC/DC converter, where the energy storage system 38 is connected to the DC link 16 via the further converter 40. The power provision entity 36 is optional and may be omitted. If included, the energy storage system 38 can be used for supply of active power to the power grid via the second and/or fourth VSCs 18 and 32 and/or via the first and/or third VSCs 14 and 30. The energy storage system 38 may therefore also be considered to be a grid supporting device. The energy storage system may comprise one or more batteries, one or more flywheels and/or one or more supercapacitors. It should here be realized that an active power provision entity 36 may be included also in the first variation of the power supporting arrangement.

According to an alternative of the second variation of the power supporting arrangement, the third VSC 30 may be connected to the fourth VSC 32 using a dedicated DC link. Thereby the first VSC 14 would be connected to the second VSC 18 via a first DC link and the third VSC 30 would be connected to the fourth VSC 32 via a second DC link. In case energy storage system are used, it is then possible that active power provision entities are connected to one or both of the DC links.

Another possibility is that the third switches SW1.3 and SW2.3 of the first and second switching arrangements 20 and 34 may be open, when the first switches SW1.1 and SW1.3 are closed and the second switches SW1.2 and SW2.2. are open.

Figure 4:
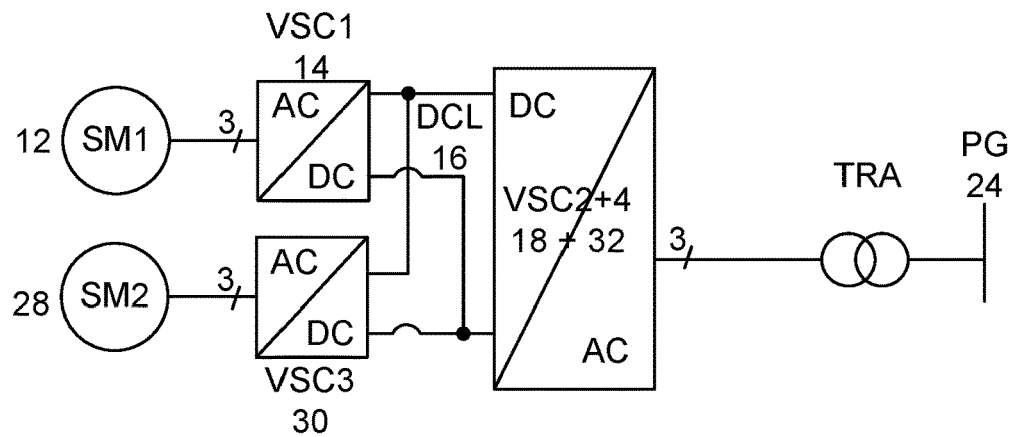
Figure 5:
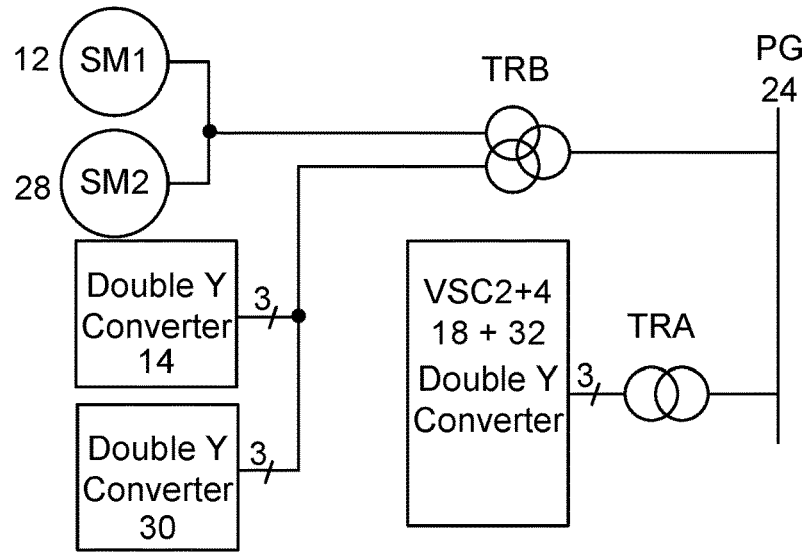
Figure 6:
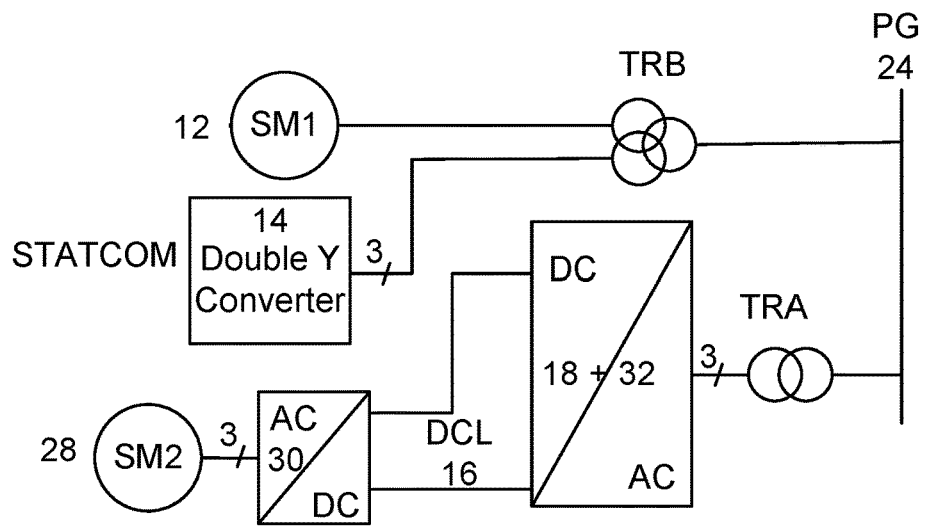

As mentioned above the power supporting arrangement increases the flexibility with which the power grid can be supported. FIGS. 4-6 schematically show a third version of the power supporting arrangement that can be used for supporting the power grid, where the third version is similar to the second version. In order to improve the understanding of the support being provided a number of simplifications have been made in relation to the second version. The switching arrangements have been omitted and the transformers of the connecting arrangement are shown when they are used. Also, the power provision entity 36 has been omitted. Moreover, as the second and fourth VSCs 18 and 32 supply power from the same DC grid, they are here considered as one converter connected to the power grid 24 via the first transformer TRA.

FIG. 4 shows the power supporting arrangement when configured for the first mode of operation that provides frequency stability control. When the third variation of the power supporting arrangement operates according to this first mode, the first synchronous machine 12 is connected to the AC side of the first VSC 14 and the second synchronous machine 28 is connected to the AC side of the third VSC 30. Thereby the first and third switches SW1.1 SW1.3 and SW2.1, SW2.3 of the first and second switching arrangements 20 and 34 are open, while the second switches SW1.2 and SW2.2 are closed. The first, second and third settable positions of the first and second switching arrangements are thereby set in the same way. In this case the synchronous machines 12 and 28 supply inertia to the DC link via the first and third VSCs 14 and 30, from where the second and fourth VSCs 18 and 32 forward it to the power grid 24. One or both of the second and fourth VSCs 18 and 32 may in this case also provide reactive power compensation for the power grid 24. The synchronous machines 12 and 28 with or without flywheels in this case form storage units, while the first, second, third and fourth VSCs 14, 18, 30, 32 are interfacing converters. The main function is to exchange active and reactive power with grid, to maintain voltage stability and mitigate ROCOF.

FIG. 5 shows the third variation of the power supporting arrangement when operating according to the second mode that provides short-circuit current support. In this case the first and third switches of the first and second switching arrangements 20 and 34 are closed, while the second switches of the first and second switching arrangements 20 and 34 are open. The first, second and third settable positions of the first and second switching arrangements are also here set in the same way. Thereby the first and second synchronous machines 12 and 28 are connected to the first AC bus, while the AC sides of the first and third VSCs 14 and 30 are connected to the second AC bus. The first AC bus in turn leads to a first set of windings of a second transformer TRB, while the second AC bus leads to a second set of windings of the second transformer TRB. In the second transformer TRB, the first and second sets of windings are in turn magnetically coupled to a third set of windings, which third set in turn is connected to the power grid 24.

The second transformer TRB may because of this be a transformer for connecting each synchronous machine and each machine side converter to the power grid 24. The second transformer TRB is a three-winding transformer and thereby it is possible to decouple the synchronous machines 12 and 28 from the machine side converters 14 and 30 for safety considerations. The first and third VSCs 14 and 30 are here connected with a double Y configuration to the second transformer TRB, thereby being Double Y converters, while the second and fourth VSCs 18 and 32 are connected to the first transformer TRA also with a double Y configuration thereby also being a Double Y converter, where a double Y converter is a converter comprising two groups of Y connected phase legs, where one group of phase legs is Y-connected between the corresponding transformer and a first line of the DC link having a first DC potential and the other group of phase legs is Y connected between the transformer and a second line of the DC link having a second DC potential. In the first transformer TRA, the AC sides of the VSCs 18 and 32 are connected to the same set of windings that are magnetically coupled to a second set of windings connected to the power grid 24. The first transformer TRA is thereby a two-winding transformer.

With this configuration, the synchronous machines 12 and 28 act as synchronous condensers and together form an inertia source, while the first and third VSCs 14 and 30 form a first reactive power source/sink and the second and fourth VSCs form a second reactive power source/sink, where the VSCs operate may operate as STATCOMs. It can also be seen that all the sources/sinks support the power grid in parallel with each other. In this mode the synchronous machines 12 and 28 are directly connected to the grid 24 through the second transformer TRB and operated as synchronous condensers. The first, second, third and fourth VSCs 14, 18, 30 and 32 are all connected to the grid 24 and act as regular STATCOMs.

A third mode hybrid of operation is shown in FIG. 6. In this case the first synchronous machine 12 and the first VSC 14 are connected as in FIG. 5, while the second synchronous machine 28 and third VSC 30 are connected as in FIG. 4. In order to obtain this the first and third switches of the first switching arrangement 20 are closed, while the second switch of the same switching arrangement 20 is open. Thereby the first synchronous machine 12 is connected to the first AC bus and the AC side of the first VSC 14 is connected to the second AC bus, where both buses lead to the second transformer TRB. However, the first and third switches of the second switching arrangement 34 are open, while the second switch of the same switching arrangement 34 is closed. The first, second and third settable positions of the second switching arrangement are thereby set in the opposite way compared with the first, second and third settable positions of the first switching arrangement. Thereby the second synchronous machine 28 is connected to the AC side of the third VSC 30.

In this case the first synchronous machine 12 and the first VSC 30 are two sources connected in parallel for providing short circuit current level support, while the second synchronous machine 28 together with the second, third and fourth VSCs 18, 30 and 32 provide frequency stability control. In this mode the power supporting arrangement delivers frequency response, voltage regulation and SCL enhancement functionalities at the same time.

As can be seen in FIGS. 3, 4, 5 and 6 the synchronous machines with or without flywheels can be connected to the grid directly or through power electronic converters in the form of voltage source converters. The machine side converter can in turn be used as an interfacing converter connected in series with the machine, or as a STATCOM connected in parallel with the machine.

As was mentioned earlier, three operating modes can be configured for the connected machines:

1. A first mode that is a Fast Frequency Response or Synthetic inertia response (FFR/SIR) mode: the machines are connected through the machine side converters to deliver active power in response to frequency or ROCOF events. The grid side converter can be designed to deliver both active and reactive power service to the grid.
2. A second mode that is a SCL enhancement (SCLE) mode: the machines are connected to the grid through a transformer and operating as synchronous condensers to enhance the grid SCL. In the meantime, the machine side converter can also be connected to the grid through a transformer and operated as regular STATCOMs to further strengthening the voltage stability.
3. A third mode that is a Hybrid mode: some of the machines are connected through a transformer and operated as synchronous condensers, and the rest are connected through back-to-back converter to deliver inertia to grid.

When the grid is experiencing low inertia, the FFR/SIR mode can be used; when the grid is experiencing low SCL, the SCLE mode can be used; hybrid mode can be used when both services are desired. Furthermore, additional energy resources 38, such as super-cap, flywheel and battery, can as is shown in FIG. 3, be connected at the DC link 16 to expand the system capability.

The power supporting arrangement thereby provides a transformable integration of three Flexible AC Transmission System (FACTS) devices, i.e. synchronous condenser, flywheel storage system and STATCOM, which makes it capable of delivering both active power (in tens of seconds time range) and reactive power, as well as enhancing network SCL at the same time.

Each of the FACTS devices mentioned above cannot fulfill all the future demand of the grid services by itself:

Synchronous condenser technologies come with simple control systems and contribute with short circuit current to enhance SCL, in addition to being able to temporarily provide high reactive power overload, for example for voltage dip mitigation. However, the voltage regulation speed of a synchronous condenser is much lower than that of a STATCOM, and the inertia it delivers to the grid is quite limited even if a flywheel is attached.

STATCOM technologies are FACTS that resort to the use of Power Electronics. STATCOM technologies come with symmetric operating regions and fast response control systems. The response is fast both for set-point changes and for dynamic voltage support in case of disturbance in the power network. STATCOM technologies can also provide very fast absorption/injection of reactive power during (fault period) and after the disturbance (fault recovery period), in addition to high absorption of reactive power in case of over-voltage scenarios. In addition, they can come with capabilities such as active filtering, flicker compensation and power oscillation damping (POD). However, the STATCOM does not have the capability of delivering active power for frequency services or short circuit current for increasing SCL.

A synchronous machine with flywheel connected to the grid through a power converter has the capability of fast active power injection/absorption to mitigate high ROCOF and bringing inertia to the power grid to maintain stability. However, the storage unit is connected to the grid through a converter which limits the short circuit current and makes it less useful in terms of short circuit current provision and SCL enhancement.

A simple paralleling of all the three grid supporting devices can fulfill all the requirements, but it is costly and bulky with limited flexibility. As can be seen above, the power supporting arrangement is a flexible combination of the grid supporting devices and can maximize their utilization.

The example given below illustrates the versatility of the power supporting arrangement.

The synchronous machines 12 and 28 may be 70 MVA, 13.8 kV, 3 kA, 50 Hz, with flywheel resulting in effective energy 350 MW·s from 20-50 Hz; the overcurrent capability of the machine is 3 p.u. for 10 sec and 20 p.u. for transient peak.

The machine side VSCs 14 and 30 may be 50 MVA, 13.8 kVac.

The grid side VSCs 18 and 32 may together be 140 MVA, 13.8 kVac.

Take 70 MVA, 13 kV, 3 kA as the base values.

In SIR mode shown in FIG. 4, the two machines 12 and 28 are connected through the first second, third and fourth VSC 14, 18, 30 and 32 to provide synthetic inertia. The total active power may be 1.43 p.u., reactive power 1.43 p.u., short circuit current 3 p.u. for transient, and the total energy nay be 700 MW·s.

In SCLE mode shown in FIG. 5, the two synchronous machines 12 and 28 are connected through the second transformer TRB, the two machine side converters 14 and 30 are operated as STATCOMs as well as the grid side converters 18 and 32. The total active power is none, reactive power 5.43 p.u., short circuit current 40 p.u. for transient and 6 p.u. for 10 sec, and the total energy is 66 MW·s (assume 48-50 Hz machine speed variation).

In hybrid mode shown in FIG. 6, one of the machines, as an example the first machine 12, is connected through the second transformer TRB, the other machine, in this case the second machine 28, is connected through the machine side converters 18 and 32. In this mode, the total active power is 0.72 p.u., total reactive power is 3.57 p.u., short circuit current 20 p.u. for transient and 3 p.u. for 10 sec, and the total energy is 350 MW·s.

The motivation for the development of the power supporting arrangement is based on the current and future challenges that the electric power grids are facing. The increasing penetration of non-synchronous generation and retirement of conventional generation has brought down the power system effective inertia resulting in worse frequency stability and high ROCOF. In addition, the system inertia varies with total system demand over the day.

On the other hand, the power grids expect to see a decline in SCL in transmission level due to a fewer number of synchronous generators in the power grid. For the distribution level the maximum SCL tends to increase due to more connections of non-synchronous generation and increase in demand, but since the SCL contribution from transmission level is major for distribution level, the minimum SCL in distribution level will also decrease. The final consequence is the variation of SCL in both transmission and distribution level will become larger during a day and during a year. It is also well known that low SCL has negative impact on transmission protection (delayed or no protection triggering) and converter interfaced generators (wrong reference for phase locked loop during fault due to voltage instability in low SCL), and finally affects the safety of the whole system. Thus, it is of great importance to have a solution that can maintain the system SCL.

An exemplifying 24 hour operation of the power supporting arrangement is given below for addressing grid conditions and or Transmission System Operator (TSO) preferences.

During morning time 0-6 o'clock, both the inertia and SCL may be at low level. The power supporting arrangement can then be operated in the hybrid mode to deliver both SCL enhancement and inertia response to the grid. Considering that during this time period the generators are at low level of generation, they can reserve plenty of room for frequency response, thus the SCL Enhancement may have higher priority.

During morning time 6-12 o'clock, both the inertia and SCL may be at high level. The power supporting arrangement can then be operated in the hybrid mode. Considering that during this time period, the generators are at high level of generation, they have less room reserved for frequency response, thus the Synthetic Inertia mode may have higher priority.

During afternoon time 12-18 o'clock, the grid inertia may be at a high level while the SCL can reach low level during summer (lower consumption). The power supporting arrangement can then be operated in the SCL enhancement mode.

During evening time 18-24 o'clock, the grid inertia may be at a low level while the SCL can reach a high level. The power supporting arrangement can then be operated in the synthetic inertia mode.

The overall operation guarantees that the power supporting arrangement supports the grid to maintain frequency stability and SCL, which is thus done while maximizing the utilization of the system components and expanding their functionalities. Thereby the power supporting arrangement may provide synthetic inertia response, voltage regulation service and short circuit contribution at the same time or according to grid conditions/TSO preferences.

The change between different modes may be performed under the control of one or more control units, which one or more control unit, may especially control the switching arrangements. Such a control unit may be realized as a processor acting on computer instructions, such as one or more discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which acts as a control unit when being loaded into a processor.

From the foregoing discussion it is evident that the present invention can be varied in a multitude of ways. It shall consequently be realized that the present invention is only to be limited by the following claims.

The invention claimed is:

1. A power supporting arrangement for a power grid, the power supporting arrangement comprising:

first, second, third and fourth voltage source converters, each voltage source converter having a respective AC side and a respective DC side;

a DC link interconnecting the DC sides of the first, second, third and fourth voltage source converters;

first and second switching arrangements, each switching arrangement having a number of settable positions;

a first synchronous machine; and a second synchronous machine;

wherein the AC side of the second voltage source converter is connected to the power grid and the first switching arrangement is connected between the first synchronous machine, the AC side of the first voltage source converter and the power grid, thereby making the first voltage source converter into a machine side converter and the second voltage source converter into a grid side converter;

wherein the AC side of the fourth voltage source converter is connected to the power grid and the second switching arrangement is connected between the second synchronous machine, the AC side of the third voltage source converter and the power grid, thereby making the third voltage source converter into a machine side converter and the fourth voltage source converter into a grid side converter;

wherein the first switching arrangement is operable to selectively connect the first synchronous machine to the power grid in a first configuration and to the AC side of the first voltage source converter in a second configuration, wherein the first synchronous machine is connected to the power grid in a first settable position of the first switching arrangement in the first configuration and to the AC side of the first voltage source converter in a second settable position of the first switching arrangement in the second configuration; and wherein the second switching arrangement is operable to selectively connect the second synchronous machine to the power grid in a first configuration and to the AC side of the third voltage source converter in the second configuration, wherein the second synchronous machine is connected to the power grid in a first settable position of the second switching arrangement in the first configuration and to the AC side of the third voltage source converter in a second settable position of the second switching arrangement in the second configuration.

2. The power supporting arrangement according to claim 1, wherein, when the first switching arrangement is set in the second settable position, the power supporting arrangement is configured to provide reactive power and inertia support to the power grid, where the inertia is delivered from the first synchronous machine via the first and second voltage source converters and the DC link.

3. The power supporting arrangement according to claim 1, wherein, when the first switching arrangement is set in the first settable position, the first synchronous machine is configured to supply reactive power and inertia to the power grid in parallel with the second voltage source converter providing reactive power support.

4. The power supporting arrangement according to claim 3, wherein the first voltage source converter is configured to provide reactive power support to the power grid in parallel with the second voltage source converter and in parallel with the inertia and reactive power from the first synchronous machine.

5. The power supporting arrangement according to claim 1, wherein, when the second switching arrangement is set in the second settable position, the power supporting arrangement is configured to provide reactive power and inertia support to the power grid, where the inertia is delivered from the second synchronous machine via the third and fourth voltage source converters and the DC link.

6. The power supporting arrangement according to claim 1, wherein, when the second switching arrangement is set in the first settable position, the second synchronous machine is configured to supply inertia and reactive power to the power grid in parallel with the fourth voltage source converter providing reactive power support.

7. The power supporting arrangement according to claim 6, wherein the third voltage source converter is configured to provide reactive power support to the power grid in parallel with the second voltage source converter and in parallel with the inertia and reactive power from the second synchronous machine.

8. The power supporting arrangement according to claim 1, where the first and second settable positions of the second switching arrangement are set in the same way as in the first switching arrangement.

9. The power supporting arrangement according to claim 1, wherein the first and second settable positions of the second switching arrangement are set in the opposite way compared with the first and second settable positions of the first switching arrangement.

10. The power supporting arrangement according to claim 1, further comprising an energy storage system connected to the DC link via a further converter for supplying or receiving active power supporting the power grid.

11. A power supporting arrangement for a power grid, the power supporting arrangement comprising:
first, second, third and fourth voltage source converters, each voltage source converter having a respective AC side and a respective DC side;
a DC link interconnecting the DC sides of the first, second, third and fourth voltage source converters;
a first transformer for connection of each grid side voltage source converter to the power grid;
first and second switching arrangements, each switching arrangement having a number of settable positions;
a first synchronous machine; and
a second synchronous machine;
wherein the AC side of the second voltage source converter is connected to the power grid and the first switching arrangement is connected between the first synchronous machine, the AC side of the first voltage source converter and the power grid, thereby making the first voltage source converter into a machine side converter and the second voltage source converter into a grid side converter;
wherein the AC side of the fourth voltage source converter is connected to the power grid and the second switching arrangement is connected between the second synchronous machine, the AC side of the third voltage source converter and the power grid, thereby making the third voltage source converter into a machine side converter and the fourth voltage source converter into a grid side converter;
wherein the first switching arrangement is operable to selectively connect the first synchronous machine to the power grid in a first configuration and to the AC side of the first voltage source converter in a second configuration, wherein the first synchronous machine is connected to the power grid in a first settable position of the first switching arrangement in the first configuration and to the AC side of the first voltage source converter in a second settable position of the first switching arrangement in the second configuration; and
wherein the second switching arrangement is operable to selectively connect the second synchronous machine to the power grid in a first configuration and to the AC side of the third voltage source converter in a second configuration, wherein the second synchronous machine is connected to the power grid in a first settable position of the second switching arrangement in the first configuration and to the AC side of the third voltage source converter in a second settable position of the second switching arrangement in the second configuration.

12. The power supporting arrangement according to claim 11, wherein the first transformer is a single winding transformer.

13. The power supporting arrangement according to claim 11, further comprising a second transformer for connecting each synchronous machine and each grid side converter to the power grid.

14. The power supporting arrangement according to claim 13, wherein the second transformer is a three-winding transformer comprising a first group of windings connected to a first bus leading to each synchronous machine, a second group of windings connected to a second bus leading to each grid side converter and a third group of windings for connection to the power grid.

15. A power supporting arrangement for a power grid, the power supporting arrangement comprising:
first, second, third and fourth voltage source converters, each voltage source converter having a respective AC side and a respective DC side;
a DC link interconnecting the DC sides of the first, second, third and fourth voltage source converters;
first and second switching arrangements, each switching arrangement having a number of settable positions;
a first synchronous machine; and
a second synchronous machine;
wherein the AC side of the second voltage source converter is connected to the power grid and the first switching arrangement is connected between the first synchronous machine, the AC side of the first voltage source converter and the power grid, thereby making the first voltage source converter into a machine side converter and the second voltage source converter into a grid side converter;
wherein the AC side of the fourth voltage source converter is connected to the power grid and the second switching arrangement is connected between the second synchronous machine, the AC side of the third voltage source converter and the power grid, thereby making the third voltage source converter into a machine side converter and the fourth voltage source converter into a grid side converter;
wherein the first switching arrangement is operable to selectively connect the first synchronous machine to the power grid in a first configuration and to the AC side of the first voltage source converter in a second configuration, wherein the first synchronous machine is connected to the power grid in a first settable position of the first switching arrangement in the first configuration and to the AC side of the first voltage source converter in a second settable position of the first switching arrangement in the second configuration;
wherein the second switching arrangement is operable to selectively connect the second synchronous machine to the power grid in a first configuration and to the AC side of the third voltage source converter in a second configuration, wherein the second synchronous machine is connected to the power grid in a first settable position of the second switching arrangement in the first configuration and to the AC side of the third voltage source converter in a second settable position of the second switching arrangement in the second configuration;

wherein, when the first switching arrangement is set in the first settable position, the first synchronous machine is configured to supply reactive power and inertia to the power grid in parallel with the second voltage source converter providing reactive power support; and wherein, when the first switching arrangement is set in the second settable position, the power supporting arrangement is configured to provide reactive power and inertia support to the power grid, where the inertia is delivered from the first synchronous machine via the first and second voltage source converters and the DC link.

16. The power supporting arrangement according to claim 15, wherein, when the second switching arrangement is set in the second settable position, the power supporting arrangement is configured to provide reactive power and inertia support to the power grid, where the inertia is delivered from the second synchronous machine via the third and fourth voltage source converters and the DC link.

17. The power supporting arrangement according to claim 15, wherein, when the second switching arrangement is set in the first settable position, the second synchronous machine is configured to supply inertia and reactive power to the power grid in parallel with the fourth voltage source converter providing reactive power support.

18. The power supporting arrangement according to claim 15, where the first and second settable positions of the second switching arrangement are set in the same way as in the first switching arrangement.

19. The power supporting arrangement according to claim 15, wherein the first and second settable positions of the second switching arrangement are set in the opposite way compared with the first and second settable positions of the first switching arrangement.

20. The power supporting arrangement according to claim 15, further comprising an energy storage system connected to the DC link via a further converter for supplying or receiving active power supporting the power grid.

* * * * *